United States Patent [19]

Castrodale et al.

[11] E Re. 29,380

[45] Reissued Aug. 30, 1977

[54] RECORDING APPARATUS FOR MAGNETIC DISKS USING BOTH SIDES OF THE DISK

[75] Inventors: Daniel O. Castrodale; Steven G. Steele; William S. Wentink; Stephen E. Wheeler, all of Rochester, Minn.

[73] Assignee: International Business Machines Corporation, Armonk, N.Y.

[21] Appl. No.: 724,663

[22] Filed: Sept. 20, 1976

Related U.S. Patent Documents

Reissue of:

[64] Patent No.: 3,946,439
Issued: Mar. 23, 1976
Appl. No.: 545,841
Filed: Jan. 31, 1975

[51] Int. Cl.[2] ..... G11B 5/54; G11B 5/48; G11B 5/60

[52] U.S. Cl. ..... 360/105; 360/86; 360/99

[58] Field of Search ..... 360/105, 102-103, 360/106, 86, 109, 97-99, 77, 135; 346/137

[56] References Cited

U.S. PATENT DOCUMENTS

| | | | |
|---|---|---|---|
| 3,018,152 | 1/1962 | Cowan | 360/105 |
| 3,646,536 | 2/1972 | Bleiman | 360/105 |
| 3,702,997 | 11/1972 | Jamieson | 360/105 |
| 3,713,121 | 1/1973 | Fasano et al. | 360/105 |
| 3,731,006 | 5/1973 | Streiert et al. | 360/106 |
| 3,751,603 | 8/1973 | Prieur | 360/105 |
| 3,768,083 | 10/1973 | Pejcha | 346/137 |
| 3,855,622 | 12/1974 | Truscelli | 360/103 |

*Primary Examiner*—Alfred H. Eddleman
*Attorney, Agent, or Firm*—Keith T. Bleuer

[57] ABSTRACT

Magnetic disk recording apparatus including a pair of magnetic transducers contacting the opposite sides of a magnetic disk and each carried by a swingable arm. The arms are interconnected together so that the swinging movement of one of the arms is transmitted to the other arm to cause an opposite swinging movement of the other arm for simultaneously moving the transducers away from the magnetic disk. An electro-magnet actuates one of the arms so as to thereby also move the other arm.

22 Claims, 6 Drawing Figures

RECORDING APPARATUS FOR MAGNETIC DISKS USING BOTH SIDES OF THE DISK

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is related to Daniel O. Castrodale et al. application for Data Storage Apparatus Using A Flexible Magnetic Disc, Ser. No. 570,118, filed Apr. 21, 1975 and to a continuation of said application by Daniel O. Castrodale et al., Ser. No. 776,456, filed Mar. 10, 1977 for Data Storage Apparatus Using A Flexible Magnetic Disk.*

BACKGROUND OF THE INVENTION

The invention relates to magnetic recording apparatus and particularly to apparatus for recording on magnetic disks.

It has previously been common practice to record only on one side of a flexible magnetic disk at a time. Such recording, of course, limits the capacity of the apparatus with respect to the total amount of information that may be recorded and the speed with which the information may be recorded.

SUMMARY OF THE INVENTION

It is an object of the present invention to provide improved recording apparatus by means of which two-sided recording may be accomplished on a moving magnetic medium and particularly on a flexible magnetic disk for thereby providing increased capacity and speed of recording. In this connection, it is an object of the invention to provide a pair of magnetic transducers effective on the opposite sides of a magnetic disk and means for holding the transducers in simultaneous contact with the disk so that simultaneous data transfer may take place on the two sides of the disk, *assuming that the proper electrical connections for either a reading or a writing action are completed to both of the transducers at the same time.*

It is a further object of the invention to provide improved means for carrying such a pair of transducers so that the two transducers are moved simultaneously into recording engagement with the opposite sides of a magnetic disk and are moved simultaneously out of contact with the disk when it is desired to remove the disk from between the transducers.

More specifically, it is an object of the invention to provide a pair of arms on which the two transducers are mounted and to interconnect the arms so that the movement of one arm automatically causes the other arm to move, so that the two transducers are simultaneously moved with respect to the disk. In this connection, it is an object of the invention to provide power mechanism operative on one of the arms to thereby simultaneously move both of the arms and their magnetic transducers.

DESCRIPTION OF THE PREFERRED EMBODIMENTS

Figure 1:
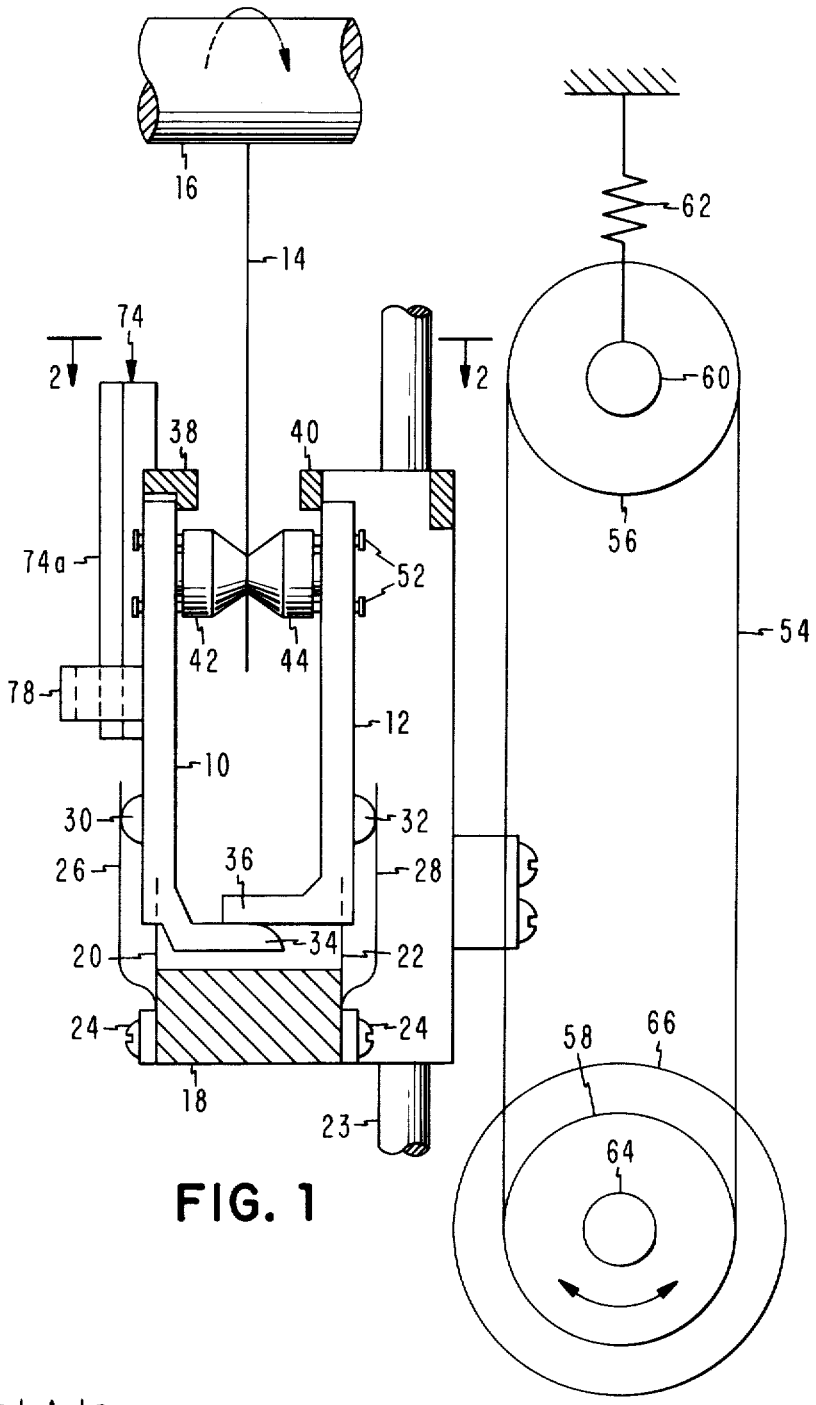
FIG. 1 is a side elevational view, partially schematic, of magnetic disk recording apparatus including a pair of magnetic transducers positioned on opposite sides of a magnetic disk by means of a pair of swing arms carrying the transducers.

Referring to FIG. 1 in particular, the magnetic head load mechanism shown therein may be seen to comprise a pair of arms 10 and 12 on opposite sides of a magnetic disk 14. The magnetic disk 14 at its center is fixed on a rotatable drive shaft 16 and may be of a thin flexible material, such as polyethylene terephthalate of about .003 inch thickness, for example. The disk 14 is coated on both sides with a magnetic material, such as iron oxide.

The arms 10 and 12 are respectively mounted on a carriage 18 by means of cantilever leaf springs 20 and 22. The carriage 18 is slideably disposed on fixed guide rods 23 extending through the carriage 18. The springs 20 and 22 may have their upper ends embedded in the arms 10 and 12, and the lower ends of the springs 20 and 22 may be fixed with respect to the carriage 18 by means of screws 24. A pair of loading leaf springs 26 and 28 are fixed with respect to the carriage 18 by means of the screws 24 and bear respectively on rounded protrusions 30 and 32 on the arms 10 and 12. The arm 10 is provided with a slider portion 34 which underlies a slider portion 36 of the arm 12 whereby the portion 34 may cause a swinging movement of the portion 36 and thereby of the arm 12 as will be described in greater detail hereinafter.

The springs 26 and 28 urge the arms 10 and 12 toward each other, and the carriage 18 carries a pair of stops 38 and 40 for limiting the motion of the arms 10 and 12 toward each other. The arms 10 and 12 respectively carry magnetic transducers 42 and 44 of similar construction. The transducer 42 is shown in section in FIG. 3, and it will be observed that the transducer 42 is hollow and fits over a head guide 46 integral with the arm 10. A spring 48 is disposed between the head guide 46 and an opposite internal surface of the transducer 42 and urges a magnetic head 50 on the end of the transducer 42 into forceful engagement with the disk 14. A plurality of headed studs 52 extend through the arm 10 and into the transducer 42 for the purpose of limiting the movement of the transducer 42 under the action of the spring 48 under the conditions in which the transducer 42 is separated from the disk 14 as will be described.

The carriage 18 is carried by and is fixed with respect to a flexible belt 54 that extends around spaced pulleys 56 and 58. The pulley 56 is rotatably mounted on an axle 60 having a spring 62 effective on the axle. The pulley 58 is fixed on the output shaft 64 of a motor 66 which is preferably of the electrical stepping type. The belt 54 is fixed by any suitable means with respect to the pulley 58.

An electric solenoid 68 (see FIG. 2) is mounted on a stationary part 70 and is effective on an armature portion 72 of a lever 74. The lever 74 pivots about an edge 70a of the stationary part 70. A spring 76 is effective between the lever 74 and the stationary part 70, and the part 70 has an abutment edge 70b which limits the pivoting movement of the lever 74 about the edge 70a under the action of the spring 76. The arm 10 carries a hook 78 that encompasses the lever end 74a. The lever end 74a has an increased width with respect to the rest of the lever 74 to function as a lost motion connection between lever 74 and arm 10 and allow for a substantial movement of the carriage 18 along the stationary guide rods 23.

Figure 2:
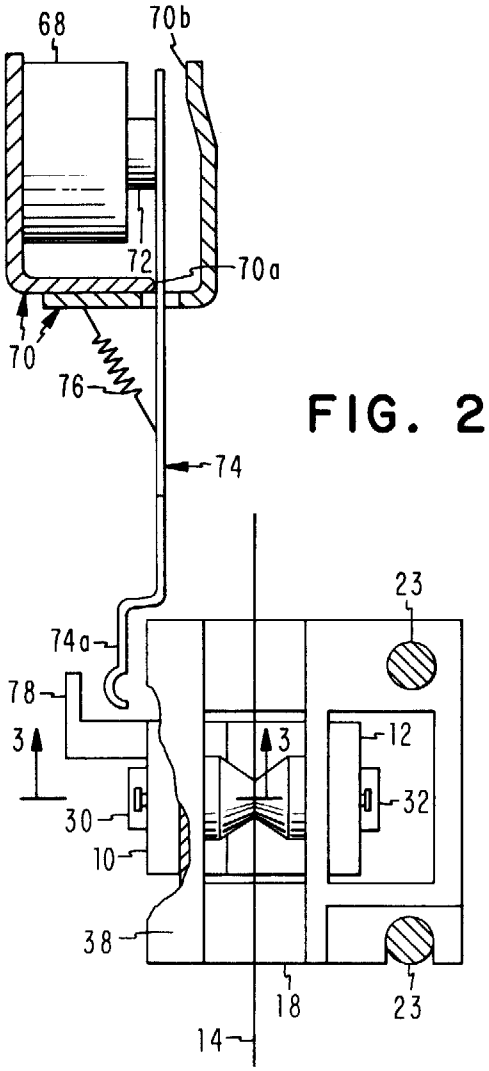
FIG. 2 is a sectional view taken on line 2—2 of FIG. 1.

In operation, the transducers 42 and 44 are normally held in contact with opposite sides of the flexible disk 14 as shown in FIGS. 1 and 2, and the disk 14 is rotated by means of its drive shaft 16 on which the disk 14 is mounted. The arms 10 and 12 are held against the stops 38 and 40 by means of the springs 26 and 28, and the springs 48 maintain the transducers 42 and 44 in engagement with the disk 14 under a pressure as determined by the springs 48. The transducers 42 and 44 may thus be used for reading and writing magnetically on the surfaces of the disk 14 by means of the magnetic heads 50 in the transducers 42 and 44 which describe circular tracks or paths on the opposite sides of the disk 14 as it rotates. The carriage 18 is moved along the guide rods 23 by means of the motor 66, so that the transducers 42 and 44 move to different concentric tracks on the surfaces of the disk 14. The motor 66 drives the belt 54 about the pulleys 56 and 58; and, since the carriage 18 is fixed with respect to the belt 54, the carriage 18 and the transducers 42 and 44 likewise move, this movement being in a direction toward or away from the center of the drive shaft 16 for the disk 14.

When it is desired to disengage the transducers 42 and 44 from the disk 14, such as for the purpose of releasing the disk 14 for replacement by another similar disk having different information on it, the electromagnet 68 is de-energized. The lever [78] *74* is thus swung about the pivot edge 70a by the action of the spring 76, and the lever 74 in this swinging movement likewise moves the arm 10 against the action of the spring 26. The spring 20 acts as a flexure joint and allows this movement of the arm 10, which is counterclockwise as seen in FIG. 1 about the spring 20 acting as a joint. The slider portion 34 of the arm 10 underlies the slider portion 36 of the arm 12, and the slider portion 34 in pivoting with the rest of the arm 10 acts on the slider portion 36 of the arm 12 and causes a similar pivoting action of the arm 12. The arm 12 pivots about the spring 22, which functions also as a flexure joint similarly to the spring 20 for the arm 10; and the arm 12 pivots in a clockwise direction as seen in FIG. 1 about the spring 22 acting as a flexure joint. The transducers 42 and 44 move along with the arms 10 and 12 and thus respectively pivot in the counterclockwise and clockwise directions to separate from the disk 14. The disk 14 may then be replaced as desired. The electromagnet 68 is energized to swing the lever 74 about the pivot edge 70a back into its FIG. 2 position in order to allow the spring 26 and 28 to return the arms 10 and 12 and the transducers 42 and 44 back into their positions of FIGS. 1 and 2 in which the transducers 42 and 44 engage the disk 14.

Figure 4:
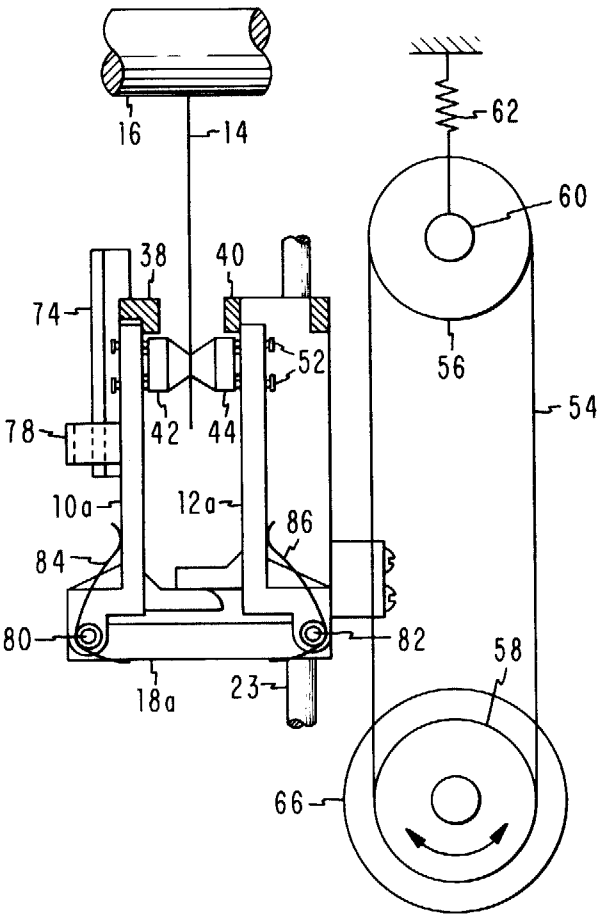
FIG. 4 is a view similar to FIG. 1 of another form of the invention.

The form of the invention illustrated in FIG. 4 is basically the same as that illustrated in the preceding figures, but the arms 10a and 12a corresponding to the arms 10 and 12 are pivotally mounted on the carriage 18a corresponding to the carriage 18 instead of being mounted by means of cantilever leaf springs. More specifically, the arms 10a and 12a are pivotally mounted on the carriage 18a by means of pivot shafts 80 and 82. Torsion springs 84 and 86 extend around the shafts 80 and 82 and bear against the arms 10a and 12a for the purpose of forcing the arms 10a and 12a together. The torsion springs 84 and 86 are used in lieu of the leaf springs 26 and 28 in the first embodiment.

Figure 6:
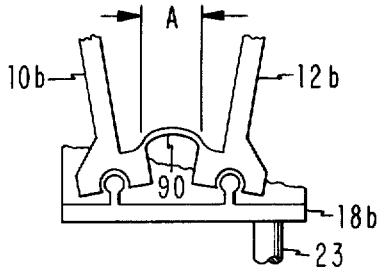
FIG. 6 is a fragmentary view in side elevation of the two swing arms of the FIG. 5 form of the invention, with the swing arms being in different positions than those shown in FIG. 5 and being swung outwardly to disengage the magnetic transducers carried thereby with respect to the associated magnetic disk.
Figure 3:
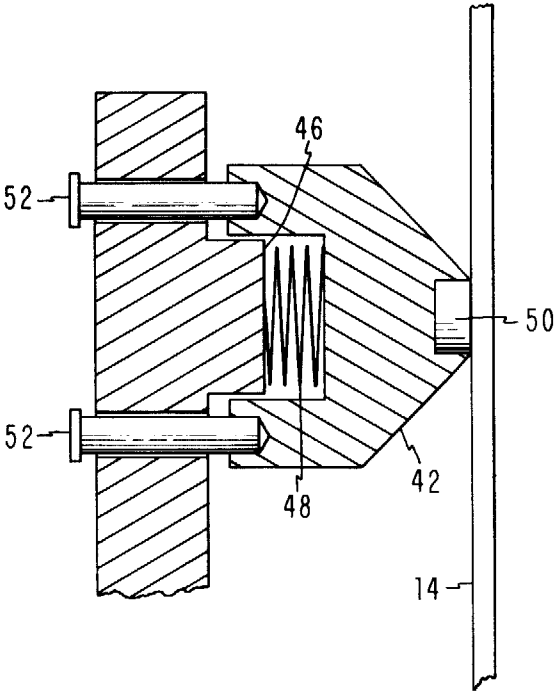
FIG. 3 is a sectional view on an enlarged scale taken on line 3—3 of FIG. 2.
Figure 5:
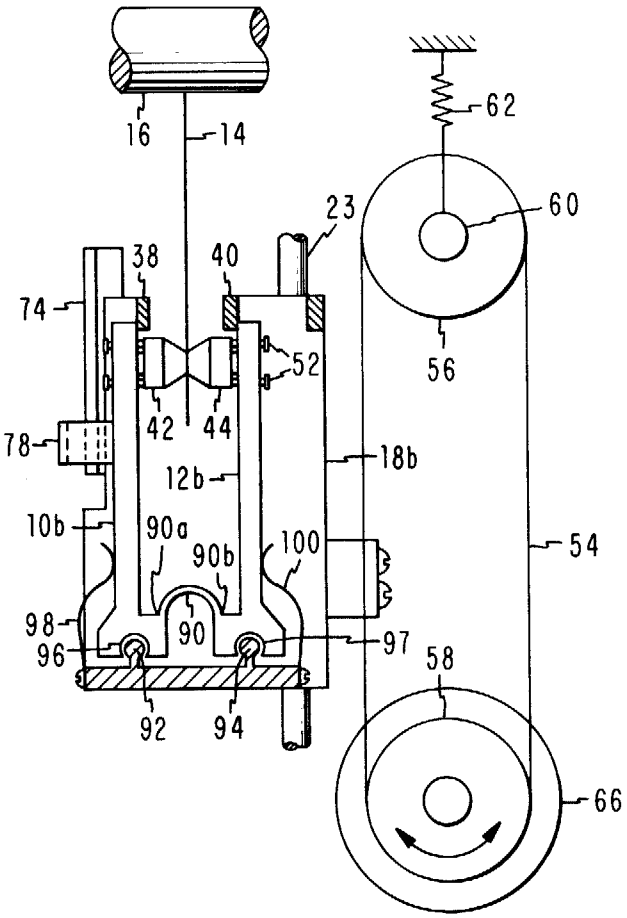
FIG. 5 is a view similar to FIGS. 1 and 4 of still another form of the invention including a pair of transducer carrying swing arms that are connected by means of a flexure integrally molded with the swing arms.

The embodiment shown in FIGS. 5 and 6 is basically the same as that shown in FIGS. 1–3, the principal difference between the FIGS. 5 and 6 embodiment and the first described embodiment being that a thin section flexure 90 is substituted for the slider portions 34 and 36. The arms 10b and 12b corresponding to the arms 10 and 12 in the first described embodiment are molded along with the flexure 90 in one piece, being of a plastic which at least in thin sections is quite flexible. It will be noted that the flexure 90 as seen in FIG. 5 simply constitutes a relatively thin upwardly bowed portion which is integral with the arms 10b and 12b and connects with these arms at points 90a and 90b. The carrige 18b which is slideably mounted on the guide rods 23 and which corresponds with the carriage 18 in the first described embodiment has a pair of upstanding rails 92 and 94 molded on it, and the arms 10b and 12b have grooves 96 and 97 molded into them which fit on the rails 92 and 94. The rails 92 and 94 and the grooves 96 and 97 are semicircular in cross sectional shape so that the arms 10b and 12b may easily swing on the rails 92 and 94. The centers of these rails and grooves are substantially equidistant from the attachment points 90a and 90b. The arms 10b and 12b may together be slid onto the rails 92 and 94 in assembling the FIG. 5 form of the invention, and the arms 10b and 12b may be held by any suitable means, such as "C" clips (not shown), from sliding off of the rails 92 and 94. A pair of leaf springs 98 and 100 are fixed with respect to the carriage 18b and bear on the arms 10b and 12b for the purpose of holding the arms 10b and 12b against the stops 38 and 40 so that the transducers 42 and 44 bear with pressure on the disk 14.

The embodiment of FIGS. 5 and 6 operates basically the same as the first described embodiment. The springs 98 and 100 hold the transducers 42 and 44 against the surfaces of the disk 14 for a magnetic reading or writing action. When the electromagnet 68 is de-energized, the lever 74 pulls the arm 10b so as to rotate the arm 10b in the counterclockwise direction as seen in FIG. 5 about the rail 92, moving the transducer 42 away from the disk 14. The flexure 90 transmits a force in the upward direction as the parts are shown in FIGS. 5 and 6 from the arm 10b to the arm 12b, causing the arm 12b to rotate in the clockwise direction and moving the transducer 44 away from the disk 14 at the same time as the transducer 42 is moved away from the disk 14. The arms 10b and 12b are shown fragmentarily in FIG. 6 in their positions in which the transducers 42 and 44 are separated from the disk 14, and it will be observed that under these conditions the flexure 90 not only transmits an upward force to the arm 12b at the attachment point 90b, but the flexure 90 has also elongated in order to compensate for the increased dimension A measured between the attachment points 90a and 90b.

The various forms of the invention above described provide two-sided recording on the magnetic disk 14 for increased capacity. They load both of the transducers 42 and 44 on the disk 14 at the same time so that both of the transducers 42 and 44 may be simultaneously effective for reading or writing magnetically on the disk 14, *assuming that the electrical connections to both of the transducers 42 and 44 are completed at the same time for either a reading action or a writing action*. In all forms of the invention, the two arms, the arms 10 and 12 in the first described form and the corresponding arms in the other forms of the invention, move simultaneously due to the connection from one arm to the other arm; and, therefore, only the single electromagnet 68 is necessary in order to cause movement of the two arms in each form of the invention. All forms of the invention are relatively simple and may be manufactured at relatively low cost. No particular pivots are needed for the arms 10 and 12 in the first described embodiment, since the cantilever leaf spring flexures 20 and 22 provide all of the pivoting action needed. The form of the invention illustrated in FIGS. 5 and 6 is considered particularly economical of manufacture, since the arms 10b and 12b along with the flexure 90 are integral parts—only one molding operation is thus necessary for producing the three parts 10b, 12b and 90.

We claim:

1. Magnetic recording apparatus comprising a magnetic medium having opposite sides both of which have a magnetic surface, a pair of transducers for magnetic action on the opposite sides of said medium, means for moving said magnetic medium so that a track or path is described by each of said transducers on a side of said medium, first and second swing arms each carrying one of said transducers, a carriage, a swing mounting for said first arm with respect to said carriage, a swing mounting for said second arm with respect to said carriage, means for moving said carriage and thereby said arms and said transducers in a direction at angles to said track so that the transducers traverse the magnetic medium on other tracks of the magnetic medium, an arm portion fixed with respect to said second swing arm adjacent to its swing mounting with said carriage and extending toward said first swing arm, and an arm portion fixed with respect to said first swing arm adjacent to its swing mounting with said carriage and extending toward said second swing arm to form a power transmitting connection with said arm portion of said second swing arm so as to swing said second swing arm and said transducer carried thereby away from said medium when said first swing arm is swung about its swing mounting with said carriage to move said first swing arm and said transducer carried thereby away from said medium.

2. Magnetic recording apparatus as set forth in claim 1, said medium being a magnetic disk and said means for moving said medium constituting a shaft extending through the center of the disk on which the disk is mounted.

3. Magnetic recording apparatus as set forth in claim 2 and including power means for swinging said first swing arm in a direction away from said medium to separate said transducer carried thereby from said medium and thereby moving said second swing arm away from said medium to separate said transducer carried by said second swing arm from said medium, and spring means for restoring said swing arms to initial positions in which said transducers are in data transferring relationship with respect to said medium.

4. Magnetic recording apparatus as set forth in claim 3, said power means including a motor and a lever swung under the action of said motor, and a hook carried by said first swing arm and extending around said lever to as to provide a lost motion connection with said lever so that the lever retains its connection with said first swing arm as said carriage moves to move said transducers from said first named track to other tracks on said disk.

5. Magnetic recording apparatus as set forth in claim 1, said arm portion fixed with respect to said first swing arm underlying said arm portion fixed with respect to said second swing arm so that as said first swing arm is swung about its swing mounting with said carriage to move its said transducer away from said medium said arm portion on said first swing arm bears against said arm portion of said second swing arm and rotates said second swing arm concommitantly with said first swing arm.

6. Magnetic recording apparatus as set forth in claim 1, said swing mounting for each of said swing arms including a leaf flexure spring connecting each of said swing arms with said carriage.

7. Magnetic recording apparatus comprising a magnetic medium having opposite sides both of which have a magnetic surface, a pair of transducers for magnetic action on the opposite sides of said medium, means for moving said magnetic medium so that a track or path is described by each of said transducers on a side of said medium, a pair of swing arms each carrying one of said transducers, a carriage, means for swingably mounting said arms on said carriage, means for moving said carriage and thereby said arms and said transducers in a direction at angles to said track so that the transducers traverse the magnetic medium on other tracks of the magnetic medium, means interconnecting a first one of said arms with a second one of said arms so that when said first arm is swung to move said transducer carried thereby away from said medium the other arm is thereby swung also to move its transducer away from said medium, said medium being a magnetic disk and said means for moving said medium constituting a shaft extending through the center of the disk on which the disk is mounted, said means for swingingly mounting said arms on said carriage including a leaf flexure spring for each of said arms and having one end embedded in the arm and having its opposite end fixed to said carriage at a point of attachment, and a leaf return spring for each of said arms fixed to said carriage at a said point of attachment and extending to an exterior surface of the arm whereby to return the arm to a position in which its said transducer is in data transferring position with respect to said disk.

8. Magnetic recording apparatus comprising a magnetic medium having opposite sides both of which have a magnetic surface, a pair of transducers for magnetic action on the opposite sides of said medium, means for moving said magnetic medium so that a track or path is described by each of said transducers on a side of said medium, a pair of swing arms each carrying one of said transducers, a carriage, means for swingingly mounting said arms on said carriage, means for moving said carriage, and thereby said arms and said transducers in a direction at angles to said track so that the transducers traverse the magnetic medium on the other tracks of the magnetic medium, means interconnecting a first one of said arms with a second one of said arms so that when said first arm is swung to move said transducer carried thereby away from said medium the other arm is thereby swung also to move its transducer away from said medium, said medium being a magnetic disk and said means for moving said medium constituting a shaft extending through the center of the disk on which the disk is mounted, said means for swingingly mounting said arms on said carriage including a pivot shaft extending through each of said arms about which the arm may pivot, and springs extending around said shafts and in contact with the associated swing arm [in] *and* with said carriage for yieldably moving said swing arms toward each other so as to bring said transducers into data transferring relationship with respect to said disk.

9. Magnetic recording apparatus comprising a magnetic medium having opposite sides both of which have a magnetic surface, a pair of transducers for magnetic action on the opposite sides of said medium, means for moving said magnetic medium so that a track or path is described by each of said transducers on a side of said medium, a pair of swing arms each carrying one of said transducers, a carriage, means for swingingly mounting said arms on said carriage, means for moving said carriage and thereby said arms and said transducers in a direction at angles to said track so that the transducers traverse the magnetic medium on other tracks of the magnetic medium, and means interconnecting a first one of said arms with a second one of said arms so that when said first arm is swung to move said transducer carried thereby away from said medium the other arm is thereby swung also to move its transducer away from said medium, said medium being a magnetic disk and said means for moving said medium constituting a shaft extending through the center of the disk on which the disk is mounted, said means interconnecting said arms including a relatively thin flexure section which extends between and is integral with said arms, said flexure section being of relatively flexible material so that when said first arm is swung to move its transducer away from said disk the other of said arms is swung likewise to move its transducer away from said disk with bending of said flexure section.

10. Magnetic recording apparatus as set forth in claim 9, said means for swingingly mounting said arms on said carriage including for each of said arms a rail with a rounded periphery carried by said carriage and fitting within a rounded cavity in the arm, said relatively thin flexure section having points of attachment to each of said arms which are located at substantially the same distances away from the respective rails and said flexure section being curved outwardly from said rails when said arms are in positions in which said transducers are closely adjacent to the surfaces of said disk for data transferring action.

11. Magnetic recording apparatus as set forth in claim 10 and including a pair of leaf springs attached to said carriage and extending therefrom to outer surfaces of said arms for returning said arms to positions in which said transducers are closely adjacent to the surfaces of said disk for data transferring action.

*12. A magnetic transducer carriage assembly for use with a moving magnetic medium, comprising:*

*a carriage adapted to be moved transversely of a moving magnetic medium,*

*a pair of transducers for magnetic action on the opposite sides of the medium,*

*first and second swing arms each carrying one of said transducers,*

*a swing mounting for said first arm with respect to said carriage,*

*a swing mounting for said second arm with respect to said carriage,*

*an arm portion fixed with respect to said second swing arm adjacent to its swing mounting with said carriage and extending toward said first swing arm, and*

*an arm portion fixed with respect to said first swing arm adjacent to its swing mounting with said carriage and extending toward said second swing arm to form a power transmitting connection with said arm portion of said second swing arm so as to swing said transducer carried by said second swing arm away from said transducer carried by said first swing arm and thereby away from a magnetic medium positioned between said transducers when said first swing arm is swung about its swing mounting with said carriage to move said transducer carried thereby away from said other transducer and thereby away from a magnetic medium positioned between said transducers.*

*13. A magnetic transducer carriage assembly as set forth in claim 12 and including spring means for restoring said swing arms to initial positions in which said transducers are in close proximity and may be in data transferring relationship with respect to a magnetic medium between said transducers.*

*14. A magnetic transducer carriage assembly as set forth in claim 12; said arm portion fixed with respect to said first swing arm underlying said arm portion fixed with respect to said second swing arm so that, as said first swing arm is swung about its swing mounting with said carriage to move its said transducer away from said other transducer and thereby away from a magnetic medium between said transducers, said arm portion on said first swing arm bears against said arm portion of said second swing arm and swings said second swing arm concomitantly with said first swing arm.*

*15. A magnetic transducer carriage assembly as set forth in claim 12, said swing mounting for each of said swing arms including a leaf flexure spring connecting the swing arm with said carriage.*

*16. A magnetic transducer carriage assembly as set forth in claim 15,*

*said leaf flexure spring for each of said arms having one end embedded in the arm and having its opposite end fixed to said carriage at a point of attachment, and*

*a leaf return spring for each of said arms fixed to said carriage at said point of attachment for this arm and extending to an exterior surface of the arm whereby to return the arms to positions in which their said transducers are in close proximity and are in data transferring position with respect to a magnetic medium between said arms.*

*17. A magnetic transducer carriage assembly as set forth in claim 12; said power transmitting connection between said arm portions including a relatively thin flexure section which extends between and is integral with said arm portions; said flexure section being of relatively flexible material so that, when said first arm is swung, it causes the other of said arms to swing likewise but in an opposite direction so as to separate said transducers with bending of said flexure section.*

*18. Magnetic recording apparatus for utilizing a magnetic disk both sides of which have a magnetic surface, said apparatus comprising:*

*a pair of transducers for magnetic action on the opposite sides of the disk,*

*rotary driving means for drivingly rotating the disk about its center,*

*first and second swing arms each carrying one of said transducers,*

*a carriage,*

*a swing mounting for said first arm with respect to said carriage,*

*a swing mounting for said second arm with respect to said carriage,*

*means for moving said carriage and thereby said arms and said transducers in a direction generally toward said driving means so that the transducers traverse across concentric tracks on the disk,*

*an arm portion fixed with respect to said second swing arm adjacent to its swing mounting with said carriage and extending toward said first swing arm, and*

*an arm portion fixed with respect to said first swing arm adjacent to its swing mounting with said carriage and extending toward said second swing arm to form a power transmitting connection with said arm portion of said second swing arm so as to swing said second swing arm and thereby move its said transducer away from said transducer carried by said first swing arm and from a disk disposed between said transducers when said first swing arm is swung about its swing mounting with said carriage to move its said transducer in a direction away from said other transducer.*

*19. Magnetic recording apparatus as set forth in claim 18 and including:*

*power means for swinging said first swing arm in a direction to move its said transducer away from said other transducer to separate said transducers, and*

*spring means for restoring said spring arms to initial positions in which said transducers are in close proximity for a data transferring relationship with respect to a disk therebetween.*

*20. Magnetic recording apparatus as set forth in claim 18, said arm portion fixed with respect to said first swing arm underlying said arm portion fixed with respect to said second swing arm so that, as said first swing arm is swung about its swing mounting with said carriage to move its said transducer away from said other transducer, said arm portion on said first swing arm bears against said arm portion of said second swing arm and swings said second swing arm concomitantly with said first swing arm to separate said transducers.*

*21. Magnetic recording apparatus as set forth in claim 18, said swing mounting for each of said swing arms including a leaf flexure spring connecting the swing arm with said carriage.*

*22. Magnetic recording apparatus as set forth in claim 18; said power transmitting connection between said arm portions including a thin flexure section which extends between and is integral with said arm portions, said flexure section being of relatively flexible material so that, when said first arm is swung in a direction to move its said transducer away from said other transducer, said second arm is swung oppositely so as to move said transducers apart with bending of said flexure section.*

* * * * *